United States Patent [19]

Coutta

[11] 4,027,329

[45] * May 31, 1977

[54] SURVEILLANCE SYSTEM

[76] Inventor: John M. Coutta, 450 Superior Ave., Decatur, Ga. 30030

[ * ] Notice: The portion of the term of this patent subsequent to Jan. 27, 1992, has been disclaimed.

[22] Filed: Jan. 26, 1976

[21] Appl. No.: 652,631

Related U.S. Application Data

[63] Continuation of Ser. No. 530,133, Dec. 6, 1974.

[52] U.S. Cl. .............................. 358/108; 358/125; 358/210; 358/229
[51] Int. Cl.² ........................................ H04N 7/18
[58] Field of Search ....... 178/6.8, DIG. 1, DIG. 35, 178/DIG. 38, 6

[56] References Cited

UNITED STATES PATENTS

| | | | |
|---|---|---|---|
| 2,538,916 | 1/1951 | Miller | 178/6 |
| 3,226,476 | 12/1965 | Tyler | 178/6 |
| 3,612,764 | 10/1971 | Gilkerson | 178/7.88 |
| 3,819,856 | 6/1974 | Pearl | 178/7.81 |

*Primary Examiner*—Robert L. Griffin
*Assistant Examiner*—Edward L. Coles
*Attorney, Agent, or Firm*—C. A. Phillips

[57] ABSTRACT

A closed circuit TV surveillance system for retail and industrial establishments in which one or more cameras are movable along a rail assembly suspended from the ceiling which enables the cameras to be selectively trained on any area of interest within the establishment. Employing two cameras, one may be both tilted and horizontally trained to observe any location within the line of sight of the camera and the other one particularly tilted and trained to observe the amount showing on a cash register.

15 Claims, 4 Drawing Figures

SURVEILLANCE SYSTEM

This is a continuation, of application Ser. No. 530,133, filed Dec. 6, 1974.

BACKGROUND OF THE INVENTION

1. Field of the Invention

This invention relates to surveillance systems, and particularly to a TV-type surveillance system adapted to be employed in a retail sales establishment having a number of checkout stations and in industrial businesses having multiple shipping and receiving docks.

2. General Description of the Prior Art

The business need of surveillance of retail and industrial sales establishments to prevent losses is well established. Thievery in such establishments is estimated to total at least three billion dollars per year in the United States alone. This in turn results in greater costs of merchandise to everyone. In recognition of this problem, television cameras have been mounted at strategic locations within an establishment and have proved beneficial at reducing thievery. The difficulty with existing such systems is that they lack the versatility to fully effectively monitor store operations. At this point, it is well to note the expanded need for surveillance which goes beyond shoplifting and includes monitoring of employees entering and leaving; employee performance and efficiency; thefts through rear doors of an establishment by employees, delivery people, and others; and perhaps most urgently needed is surveillance of checkout operations to ascertain that proper amounts are registered for merchandise. For example, it is estimated that in a 12-register "front end" where each register has a weekly volume of $8,000 and a gross volume of $384,000 per year, that there will occur a startling "shrink loss", as it is called, by virtue of failure to fully charge for merchandise, of $5,760. This is based upon a national average of 1½ percent loss.

Accordingly, it is an object of the present invention to provide a new and improved closed circuit television surveillance system which provides for operation which goes far beyond that previously available from such systems, largely shoplifting, and to enable coverage of other vital areas of concern.

SUMMARY OF THE INVENTION

In accordance with the invention, a TV camera assembly is mounted on a transporter and the transporter is in turn supported by a linear rail assembly extendng over a selected distance. The assembly is mounted on the ceiling of an establishment, typically being positioned on the "in" side of checkout stations and positioned so that cameras may be selectively positioned to observe each checkout station wihtout being observed. A semi-circular, semi-opaque cover extends along the bottom of the assembly, enabling the cameras to be masked from view. As one feature of the invention, one camera would be horizontally trainable and vertically tiltable for extensive observaton throughout the establishment, and a second camera would be tilted at a fixed angle and have a focal length adjustment of its lens adapted to observe amounts registered on a cash register at the same time the other camera is adapted t take in a wider field of view to include the clerk operating a cash register. In this fashion, the correctness of transactions may be readily monitored and at the same time the effectiveness and demeanor of the clerk may be viewed. Recordng means adapted to record discrete frames at selectively spaced periods enable effective monitoring of relatively long periods of time with relativey short actual recording periods, and thus enable the operation to be most efficiently and effectivey accomplished. For example, it has been found that by operating the recorder to record a frame per second sufficient data may be recorded. In this matter up to 48 continuous hours of business operations may be recorded on a conventional TV recorder and then reviewed in only one hour.

DETAILED DESCRIPTION OF THE DRAWINGS

Figure 1:
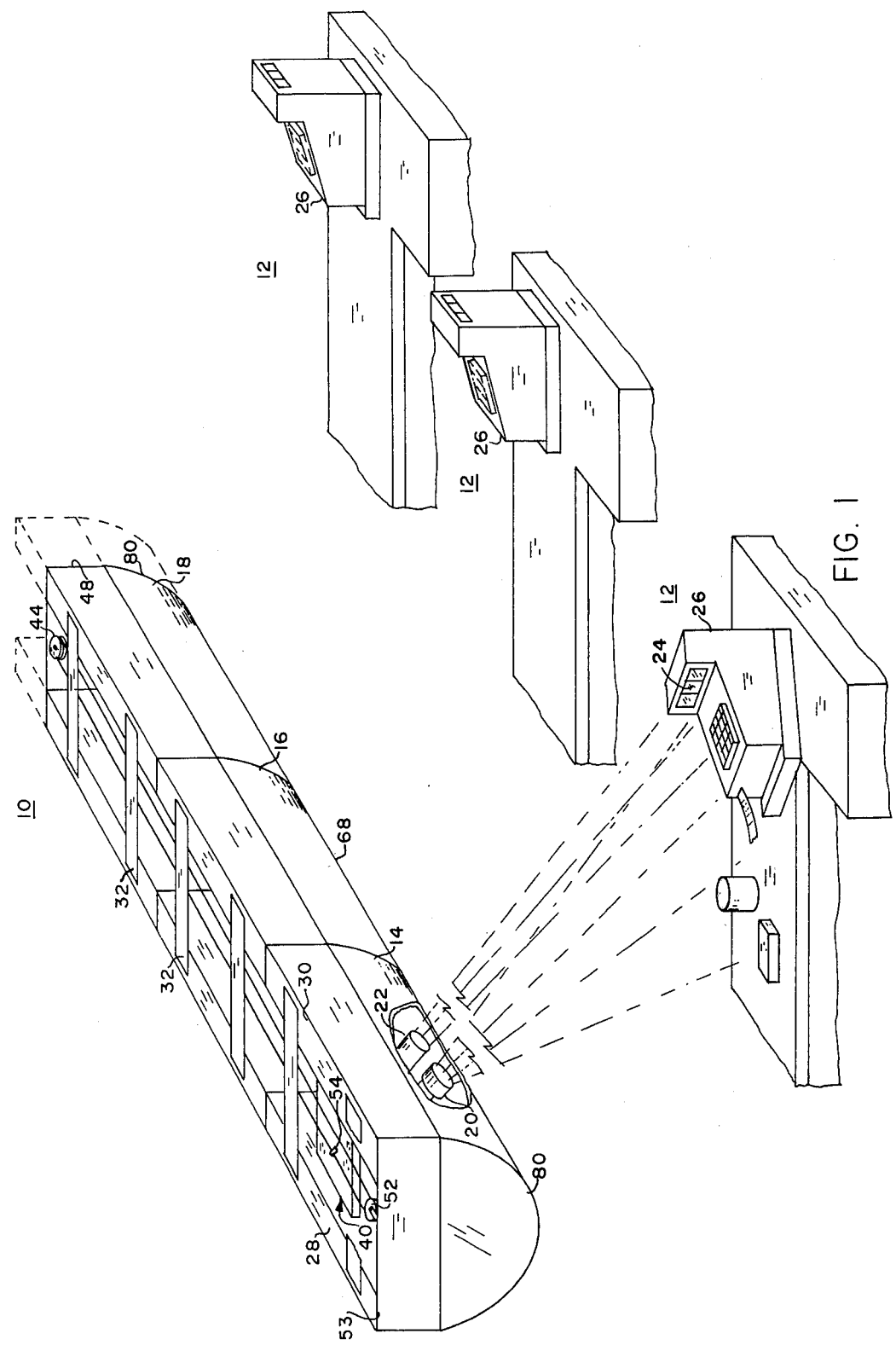
FIG. 1 is a schematic illustration of a principal portion of an embodiment of the invention.
Figure 2:
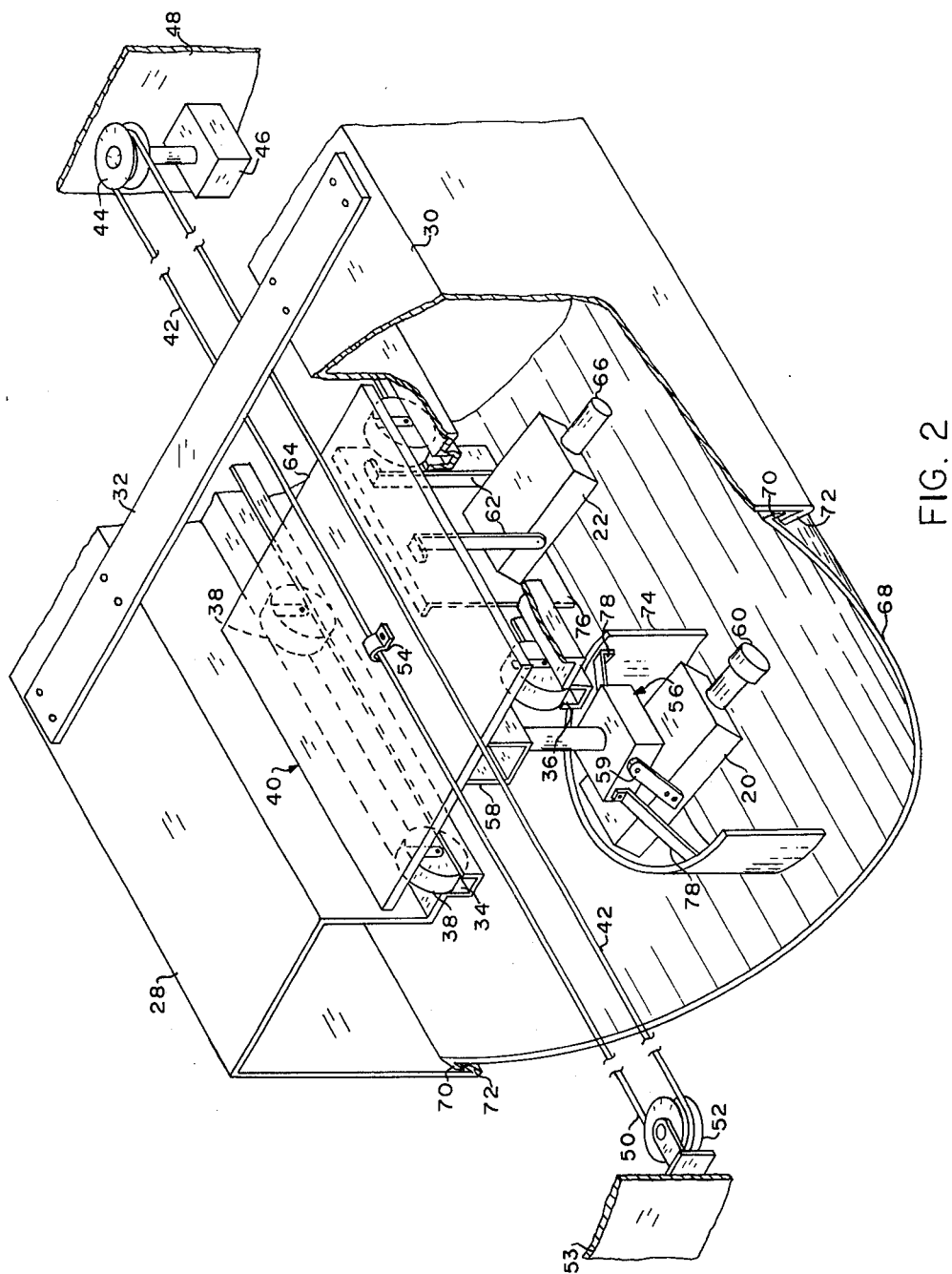
FIG. 2 is a perspective view of the arrangement of the principal components of the invention.

FIG. 1 particlarly illustrates the placement of surveillance unit 10 with respect to checkout stations 12 of a business establishment, and FIG. 2 illustrates the arrangement of components of the assembly, being actually a sectional portion of the overall assembly illustrated in FIG. 1. In practice, the system is made in sections, as illustrated by sections 14, 16, and 18 in FIG. 1 to enable ready cnstruction of surveillance assemblies of any given length. As shown in FIG. 1, camera 20 is adapted to view a complete checkout area 12 and camera 22 adapted to view a readout 24 of a cash register 26. Surveillance assembly 10 includes a pair of oppositely positioned channel members 28 and 30 which are connected by supporting strps 32 and these members are adapted to be attached to a ceiling of an establishment (not shown). A pair of guide rails 34 and 36 (FIG. 2) are connected to the inboard sides of channels 28 and 30, extending the length of the surveillance assembly. These guide rails provide a track for casters 38 which support carriage 40 and thus enable it to be transported along thelength of the surveillance assembly. Carrige 40 is driven by an endless cable 42 which in turn is connnected through pulle 44 to reversible drive motor 47 supported by end plate 48. Cable 42 is supported at the opposite end 50 by idler pulley 52 in turn supported by end plate 53. Cable 42 is attached to carriage 40 by bracket 54 which thus enables movement of carriage 40 upon operation of motor 46.

Figure 3:
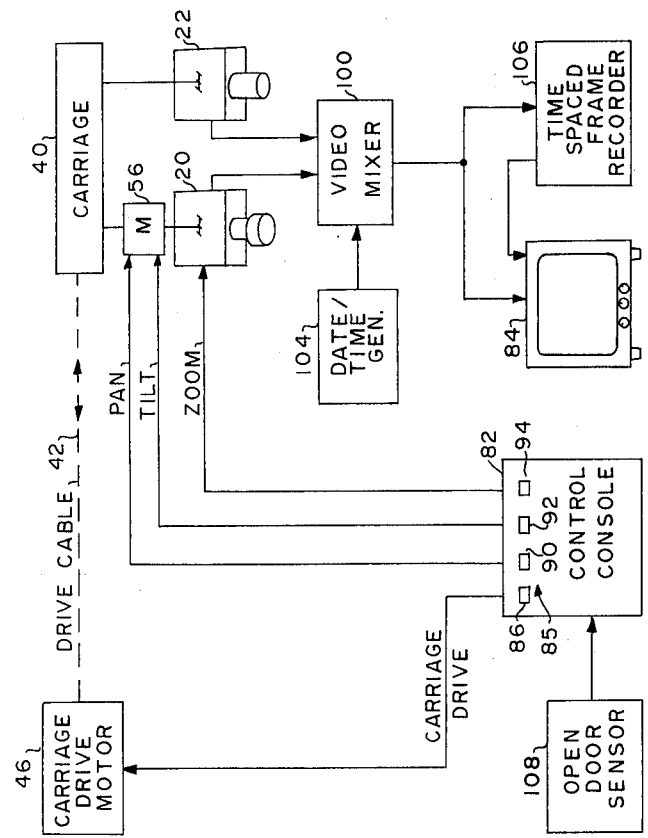
FIG. 3 is a schematic diagram of the overall system of the invention.

Camera 20 is mounted on motor assembly 56 in turn supported by U-shaped bracket 58 on carriage 40. It is rotatable by means of a reversible rotor of motor assembly 56 causing rotation about its vertical axis, and camera 20 is tiltable by means of a reversible tilt motor included in motor assembly 56 which produces rotation of arms 59 to which camera 20 is attached. Camera 20 is equipped with a zoom-type lens 60 which is remotely controlled from the console as shown in FIG. 3. A second TV camera 22 is supported by vertically disposed brackets 62 beneath platform 64 of carriage 40 and to the sides of camera 22. Typically, the focal length of lens 66 of camera 22 is manually adjusted for a desired field of view, a cash register readout as illustrated in FIG. 1.

The bottom region of surveillance assembly 10 is covered by a semi-circular, semi-opaque cover 68 which is connected by means of turned-out flanges 70 mating with turned-in flanges 72 attached to the ends of channels 28 and 30. This cover enables essentially one-way viewing, that is, the cameras can look outward through the cover, but is difficult for one to view the cameras from outside, and tus personnel cannot readily determine whether or not the cameras are positioned to view them, such as being positioned as shown in FIG. 1 opposite a checkout station 12 or positioned elsewhere as, for example, to view one of the other checkout stations. As a further aid in masking the viewing of the cameras, camera 20 includes a semi-circular shield 74 covering the back and sides of the camera, and camera 22 is covered by a shield 76, the latter being mounted on carriage 40 and the former being supported to motor assembly 56 by brackets 78. End covers 80 (FIG. 1) have a similar opacity to that of cover 68 and are secured over end plates 48 and 53.

Figure 4:
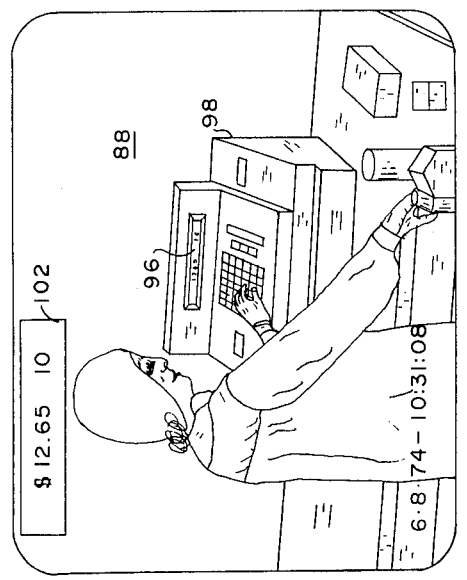
FIG. 4 is a partially perspective and diagrammatic view of a monitored display as contemplated by the invention.

The overall system of the invention is shown in FIG. 3. The system is controlled by a control console 82 which would be operated by an operator who would view TV monitor 84 and determine desired surveillance. Control console 82 contains conventional circuitry to apply by means of controls 85 the indicated output control signals to the devices they control. Thus, control 86 enables the operator to control the operation of carriage drive motor 46 to position carriage 40 and cameras 20 and 22 at a desired location as, for example, to view a particular checkout 88, as illustrated in FIG. 4. Pan control 90 reversibly controls motor assembly 56 to cause camera 20 to be trained to the left, to the right, or to the rear. Tilt cntrol 92 operates motor assembly 56 to reversibly vary the tlt of camera 20. Zoom control 94 controls the focal length control of camera 20 to vary the magnitude of the area or field to be viewed. Camera 22 is typically set at a fixed angle and left with a fixed focal length adjusted to enable it to view digital readout 96 of a cash register 98 (FIG. 4). The outputs of cameras 20 and 22 are conventonally combined in a video mixer 100 to provide as an output a composite of the camera outputs as illustrated in FIG. 4 wherein the large presentation 88 is representative of the output of camera 20, and the small presentation 102 is representative of the output of camera 22. Date-time generator 104 contains a date-time clock and provides in a conventional fashion a further input to video mixer 100, resulting in a presentation on monitor 84, and in the lower left hand corner of FIG. 4, date-time digits. Video recorder 106 is fed the same information as monitor 84 and may be operated continuously to accumulate information or to be selectivey turned on to record selected presentations. In order to provide effective monitoring over relatively long periods of time which may be presented on monitor 84 in a shorter time, means are provided to operate recorder 106 intermittently to thus, for example, record single frames at some selected relativey slow rate, say one frame per second. This, for example, thus enables playback of these same frames in a much shorter time, enabling, for examle, the monitoring of 48 hours of actual surveillance in approxmately one hour.

Open door sensor 108 is responsive to a door, typically a back door, being opened and provides a signal to control console 82 which automaticllay causes the pan and tilt signal to operate motor assembly 56, to train camera 20 on that door and to operate the zoom mechanism of camera 20 to adjust the focal length of camera 20 to a desired magnitude of field of view. This aspect of the system enables the observation, for example, of a rear door to keep track of merchandise being brought into or leaving an establishment.

From the foregoing, it will be appreciated that the present invention provides a new concept and system of surveillance of business establishments. Camera 20 may be moved, trained horizontally, tilted and zoomed to examine an extremely wide area of an establishment. At the same time it, together with camera 22, enables detailed surveillance of checkout operatons to thus very substantially reduce losses which presently occur by incorrect, often fraudulently, charges. The system further provides for effective monitoring of employee activity in general which enables effective analysis of such things as peraonnel efficiency, stock relenishment, merchandise flow from storage to counter and in general the effectivenss of personnel in their jobs. These features thus clearly distinguish the present invention over previous ones wherein the primary task was to detect and hopefully frustrate shoplifting and employee pilferage in limited areas.

What is claimed is:
1. A surveillance system comprising:
an elongated carriage track positoned along a line;
a carriage adapted to be supported by and be movably operated along said track;
drive means for positioning said carriage along said track;
a television camera supported by said carriage and positoned to view regions on the side of said track;
light attenuating means including an at least partially opaque cover extending from end to end of said track for blocking light transmission in through one region of said cover and out through another region of said cover whereby the outlines of said camera and said carriage are hidden;
display means for displaying the output of said camera; and
control means for selectively operating said drive means for selectively positioning said carriage along said track, whereby said camera may be positioned and selectively view a particular side region.
2. A surveillance system as set forth in claim 1 further comprising:
at least one additional television camera supported by said carriage, and being positioned to scan a second field of view in contrast to the field of view scanned by said first-named television camera; and
output mixing means responsive to the outputs of said cameras for superimposing the output of one camera on the other and for providing the composite output to said display means.
3. A surveillance system as set forth in claim 2 wherein regions to the side of said track include stations including cash registers, and wherein each cash register includes a digital readout, said first-named camera having a field of view of said cash register and a selected region of said station around said cash register, and said second camera havng a field of view substantially limited to said digital readout.
4. A surveillance system as set forth in claim 1 wherein said cover is semi-circular.
5. A surveillance system as set forth in claim 1 further comprising video recording means for spaced-in-time frame recording of the output of said camera.

6. A surveillance system as set forth in claim 5 further comprising a data generator coupled to the input of said video recordng means.

7. A surveillance system as set in claim 6 wherein said data generator is a date-time generator.

8. A surveillance system as set forth in claim 1 further comprising training means for tilting said camera.

9.. A surveillance system as set forth in claim 8 wherein said training means includes means for tilting said camera through 180°, whereby said camera may view regions on both sides of said track.

10. A surveillance system as set forth in claim 8 wherein said control means includes means for remotely operating said training means, whereby said camera may be selectively tilted.

11. A surveillance system as set forth in claim 10 further comprising second training means comprising means for rotating said camera horizontally.

12. A surveillance system as set forth in claim 11 wherein said control means includes means for selectively and remotely operating both of said training means, whereby said camera may be selectively and remotely tilted and trained.

13. A surveillance system as set forth in claim 12 wherein said light attenuating means includes a light shield extending to the rear and sides of said camera and supported by said training means, whereby said shield is rotated with said training means.

14. A surveillance system as set forth in claim 12 wherein said control means further comprises means for varying the magnitude of the field of view of said camera.

15. A surveillance system comprising:
an elongated carriage track positoned along a line;
a carriage adapted to be supported by and be movably operated along said track;
drive means for positioning said carriage along said track;
camera means comprising means for viewing at least two discrete fields of view to the sides of said track and providing a composite output thereof;
light attenuating means including an at least partially opaque cover extending from end to end of said track for blocking light transmission in through one region of said cover and out through another region of said cover, whereby the outlines of said camera and said carriage are hidden;
display means for displaying the outputs of said camera means; and
control means for selectively operating said drive means for selectively positioning said carriage along said track, whereby said camera means may be positioned and selectively view a particular side region.

* * * * *